United States Patent
Langberg et al.

(10) Patent No.: US 6,243,425 B1
(45) Date of Patent: Jun. 5, 2001

(54) ADAPTIVE PRECODING SYSTEM AND METHOD FOR EQUALIZING COMMUNICATION SIGNAL

(75) Inventors: Ehud Langberg, Ocean; Richard Gut, Red Bank, both of NJ (US)

(73) Assignee: Globespan Technologies, Inc., Red Bank, NJ (US)

( * ) Notice: Subject to any disclaimer, the term of this patent is extended or adjusted under 35 U.S.C. 154(b) by 0 days.

(21) Appl. No.: 09/005,645

(22) Filed: Jan. 12, 1998

Related U.S. Application Data

(60) Provisional application No. 60/053,424, filed on Jul. 22, 1997.

(51) Int. Cl.$^7$ .................................................. H04B 15/00
(52) U.S. Cl. .......................... 375/285; 375/232; 375/296; 375/265
(58) Field of Search ..................................... 375/285, 284, 375/278, 232, 265, 296, 346

(56) References Cited

U.S. PATENT DOCUMENTS

| | | | |
|---|---|---|---|
| 4,577,329 | 3/1986 | Brie et al. ............................... | 375/14 |
| 4,866,736 | 9/1989 | Bergmans ............................. | 375/18 |
| 5,008,903 | 4/1991 | Betts et al. ............................. | 375/60 |
| 5,249,200 | * 9/1993 | Chen et al. ........................... | 375/285 |
| 5,251,328 | 10/1993 | Shaw ...................................... | 455/73 |
| 5,263,051 | * 11/1993 | Eyuboglu ............................. | 375/254 |
| 5,291,520 | 3/1994 | Cole ....................................... | 375/34 |
| 5,513,216 | 4/1996 | Gadot et al. .......................... | 375/233 |
| 5,559,561 | 9/1996 | Wei ....................................... | 348/470 |
| 5,602,583 | 2/1997 | Citta ....................................... | 348/21 |
| 5,604,769 | 2/1997 | Wang .................................... | 375/229 |
| 5,646,957 | 7/1997 | Im et al. ............................... | 375/233 |
| 5,881,108 | * 3/1999 | Herzberg et al. .................... | 375/296 |
| 5,986,987 | * 11/1999 | Bliss et al. ............................ | 375/350 |

* cited by examiner

Primary Examiner—Stephen Chin
Assistant Examiner—Mohammad Ghayour
(74) Attorney, Agent, or Firm—Thomas, Kayden, Horstemeyer & Risley

(57) ABSTRACT

An adaptive preceding system is implemented within a data communications system in order to precode data to track changes in a communications channel. The adaptive precoding system initializes a set of precoder values within a precoder filter of a transmitter during an initialization phase. The precoder filter is used to create a precoding signal that is combined with a transmission data signal in order to compensate for distortions on a communications channel. During a communications phase, a decision feedback equalizer generates equalizer coefficients that correspond to changes on the communications channel. The equalizer coefficients are periodically transmitted to a converter within the transmitter over a secondary channel. The converter determines a new set of precoder values that compensate for the changes in the communications channel and slowly updates the values in the precoder filter until they match the new set of precoder values. While the precoder values are being updated, the decision feedback equalizer updates the equalizer coefficient values to reflect the improvements realized by updating the precoder values.

17 Claims, 6 Drawing Sheets

US 6,243,425 B1

ADAPTIVE PRECODING SYSTEM AND METHOD FOR EQUALIZING COMMUNICATION SIGNAL

CROSS REFERENCE TO RELATED APPLICATION

This document claims priority to and the benefit of the filing date of copending provisional application entitled ADAPTIVE PRECODER, assigned serial number 60/053,424, and filed Jul. 22, 1997, and is hereby incorporated by reference.

FIELD OF THE INVENTION

The present invention relates to data communications equipment, e.g., modems, and, more particularly, to the equalization of data signals in a data communications system.

BACKGROUND OF THE INVENTION

Conventionally, a communications receiver employs an adaptive decision feedback equalizer (DFE) to compensate for changes in a communications channel. However, the use of a DFE introduces "error propagation" effects in the receiver. As such, it is known in the art to implement a precoder with modulo arithmetic (e.g., Tomlinson filter) in a remote transmitter in order to mitigate, if not eliminate, the problem of error propagation in the receiver This conventional precoder uses coefficient values generated by the receiver during an initialization phase, sometimes referred to as a training or a start-up phase.

However, if the response, i.e., characteristics, of the communications channel changes significantly, the precoder will fail to adequately compensate for the new communications channel. As a result, a disruptive retrain is usually required so that the receiver can generate a new set of precoder coefficients., which is then sent back to the transmitter. Unfortunately, each retrain disrupts the data flow and takes time to both calculate the equalizer coefficients and to communicate them back to the remote transmitter.

SUMMARY OF THE INVENTION

The present invention overcomes the inadequacies and deficiencies of the prior art as discussed herein. The present invention provides an adaptive preceding system and method for preceding an input data signal to compensate for changes in a communications channel.

The adaptive precoding system and method of the present invention utilize a precoder filter and a converter. In accordance with the preferred embodiment of the present invention, the precoder filter is configured to maintain precoder values which may be used to precode input data signals prior to transmission on a communications channel. The converter is configured to receive equalizer coefficients periodically generated by a decision feedback equalizer and to slowly update each precoder value as conditions on the communications channel change.

As a result of slowly updating the precoder values, the quality of signals received by the decision feedback equalizer slowly improves. Accordingly, the decision feedback equalizer can update the equalizer coefficient values so that a disruptive retrain is not needed The adaptive preceding system and method of the present invention have many advantages, a few of which are delineated hereafter, as examples.

An advantage of the adaptive precoding system and method is that they provide for a scheme of compensating for changes in a communications channel. Accordingly, more reliable communication can be established.

Another advantage of the adaptive precoding system and method is that they provide for a scheme of continuously updating precoder values as interference conditions on a communications channel change. Since interference typically vary in an unpredictable fashion, more reliable communication can be achieved.

Another advantage of the adaptive precoding system and method is that the precoding values may be updated without the occurrence of a disruptive retrain. This allows for more efficient data communication since retrains require time to implement.

Other features and advantages of the present invention will become apparent to one skilled in the art upon examination of the following drawings in the detailed description. It is intended that all such additional features and advantages be included herein within the scope of the present invention.

DETAILED DESCRIPTION OF THE INVENTION

Figure 1:
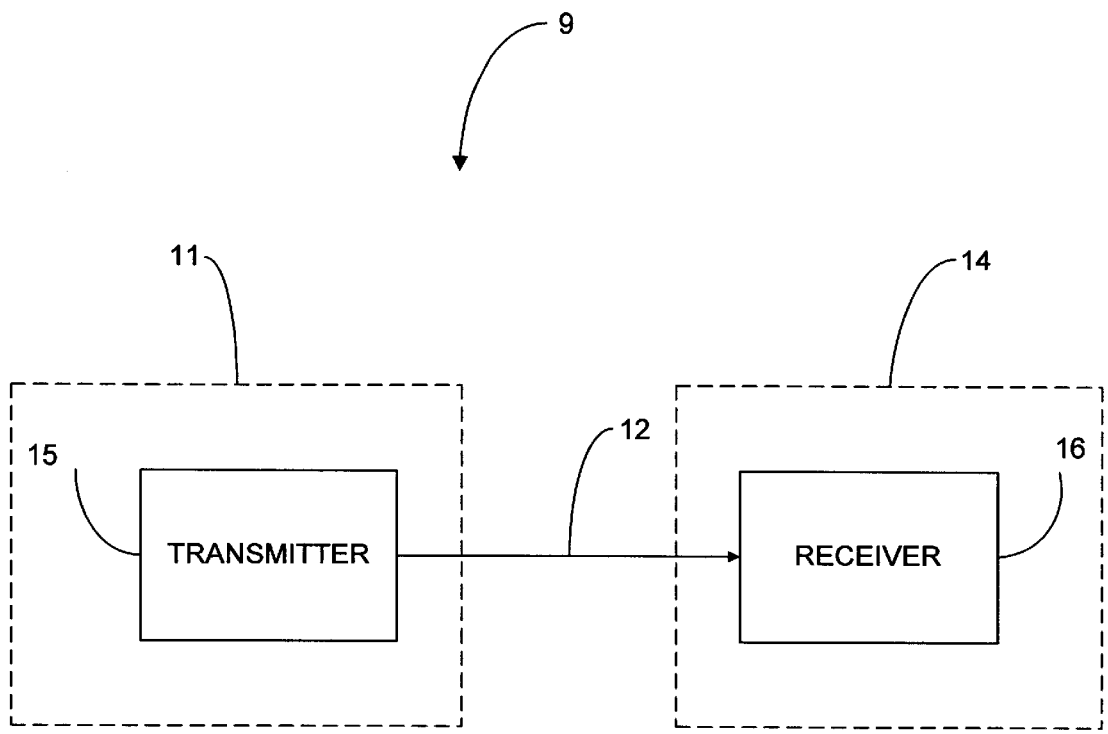
FIG. 1 is a block diagram of a prior art communications system.

An illustrative communications system 9 of the prior art is shown in FIG. 1. The communications system 9 comprises data communications equipment (DCE) 11, communications channel 12, and DCE 14. For simplicity only a single transmitter/receiver pair is shown as represented by transmitter 15, of DCE 11, and receiver 16, of DCE 14. Transmitter 15 transmits a precoded data signal, x(n), to receiver 16, via communications channel 12.

Receiver 16 typically includes a decision feedback equalizer (DFE) to compensate for interference on channel 12. General information on DFEs can be found in U.S. Pat. No. 5,513,216, entitled "Hybrid Equalizer Arrangement for use in Data Communications Equipment," filed on Oct. 13, 1994, by Gadot et al., and in U.S. Pat. No. 5,604,769, entitled "Hybrid Equlaizer Arrangement for use in Data Communications Equipment," filed on Oct. 13, 1994, by Wang, which are incorporated by reference as if set out in full hereinbelow.

Figure 2:
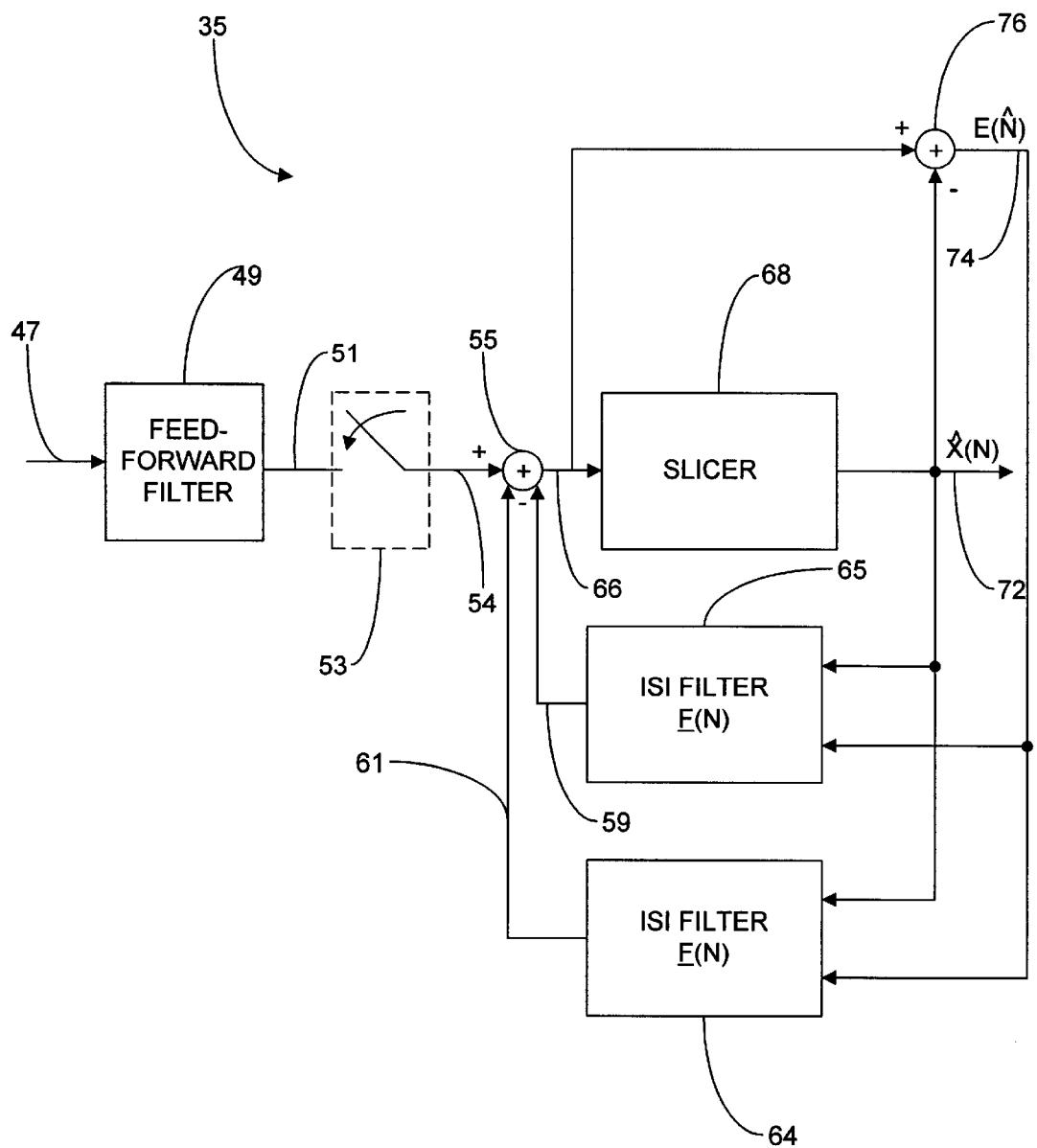
FIG. 2 is a block diagram of a prior art decision feedback equalizer.

FIG. 2 depicts a typical DFE 35 of the prior art. In FIG. 2, feedforward filter 49 whitens the noise present in the received data signal 47. Signal 47 corresponds to x(n) which is transmitted to receiver 16 (FIG. 1) subsequent to preceding by transmitter 15 (FIG. 1). The output signal 51 from feedforward filter 49 is applied, via sampler 53 and connection 54, to adder 55, which, theoretically, subtracts the inter-symbol interference (ISI) on connections 59 and 61 estimated by ISI filters 64 and 65 (described further hereinbelow). Adder 55 provides a signal 66 to slicer 68. Slicer 68 selects a particular data symbol as a function of the mapping of the signal 66 into a predefined constellation of data symbols (not shown) to provide a signal 72, x̂(n), which is an estimations of transmitted data signal x(n). Signal 72 typically represents a stream of data symbols occurring at a symbol rate of 1/T seconds and is provided for processing by feedback filters 64 and 65 and by other receiver circuitry (not shown) to recover the transmitted data x(n). For example, if trellis coding is used, x̂(n) is subsequently processed by a Viterbi decoder.

ISI filter 65 is a finite-impulse-response (FIR) filter having an impulse response represented by vector f(n). As mentioned above, ISI filter 65 uses the estimate, x̂(n), of the transmitted data to predict the amount of ISI to remove from signal 54. Adaptation of ISI filter 65 is performed by using signal 74 which is an error signal, ê(n), developed by adder 76. For illustration, it is assumed that a least-mean-square (LMS) algorithm is used to adapt the coefficients of ISI filter 65 which are sometimes referred to as ISI, "equalizer" or "feedback" coefficients. As such, then the I-th coefficient (i=0, 1, . . . , N−1) at the time instant n, $f_i(n)$, is given by:

$$f_i(n+1)=f_i(n)+2\mu \hat{e}(n)\hat{x}(n-i), \quad (1)$$

where $\mu$ is the adaptation step size For simplicity, this description assumes the use of real filters and real data. However, the inventive concept is also applicable to complex filters and data as well.

The DFE 35 is based on the assumption that x̂(n) is a good estimation of the transmitted data x(n). As along as x̂(n) is a good estimation of x(n), there is no significant amount of error. However, if the estimate of x(n) is wrong, then the feedback section adds this error to the next symbol, x(n+1), and error propagation occurs. As a result, a form of nonlinear precoding is typically used in transmitter 15 (FIG. 1) to avoid error propagation.

In modem communications there are two phases of operation. In the first phase, the "initialization" or "start-up" phase, the DFE 35 (FIG. 2) of the receiver 16 (FIG. 1) adapts to a standard test signal or training sequence received from transmitter 15 (described hereinbelow). This phase is also referred to in the art as a "start-up," or "training" phase. Typically, there is no precoding of this test signal by the transmitter 15 (FIG. 1) in the initialization phase. Once the DFE 35 (FIG. 2) adapts, the resulting set of coefficients values, $f_i(n)$, (i=0, 1, . . . , N−1), of DFE 35 are transmitted back to the transmitter 15 (FIG. 1).

It should be noted that it is known in the art for receiver 16 (FIG. 1) to generate equalizer coefficient values using a noise predicator (NP) based filter The differences between an ISI based DFE and an NP based DFE in generating the equalizer coefficient values off receiver 16 (FIG. 1) are not significant to the understanding of the present invention and, therefore, will not be discussed in detail herein, However, it should be apparent that NP based filters may be used to implement the principles of the present invention even though ISI filters will be discussed hereafter to illustrate the principles of the present invention.

Figure 3:
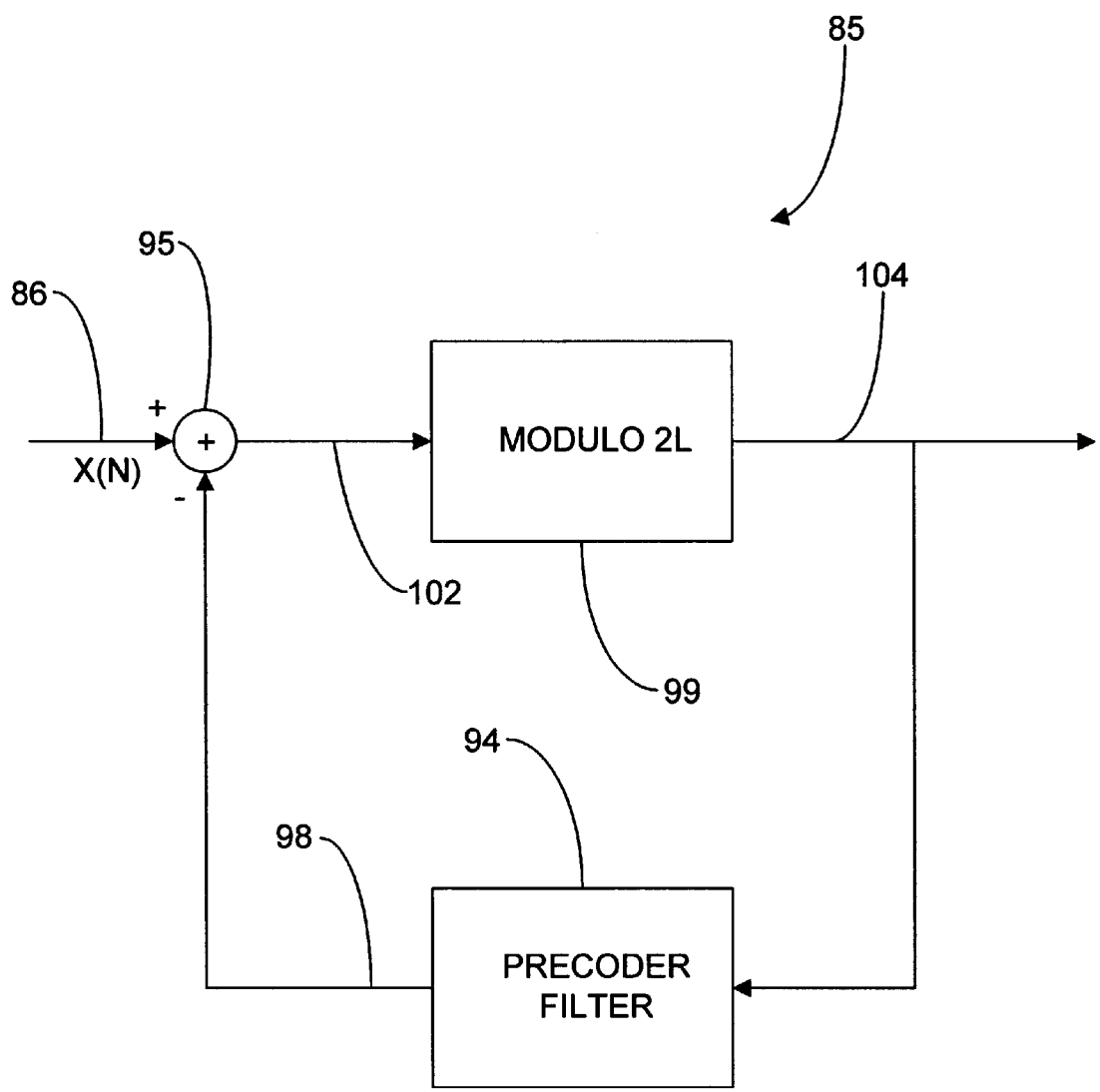
FIG. 3 is a block diagram of a prior art preceding system.

During the initialization phase, the transmitter 15 of FIG. 1 receives the equalizer coefficient values from receiver 16. Typically, transmitter 15 includes a precoder 85, as depicted in FIG. 3, to precode a signal 86, x(n), prior to transmission using any of the well-known precoding techniques, e.g., Tomlinson precoding. As known in the art, the equalizer coefficient values received from receiver 16 (FIG. 1) are stored in precoder filter 94 and will be referred to herein as the "precoder values." Once the precoder filter 94 is initialized with the precoder values, the initialization phase terminates and the data phase is initiated.

In the data phase, data signal 86 is applied to adder 95 which subtracts from signal 86 a signal 98 produced by precoder filter 94. As known in the art, signal 98 is based on the precoder values within precoder filter 94.

Figure 4:
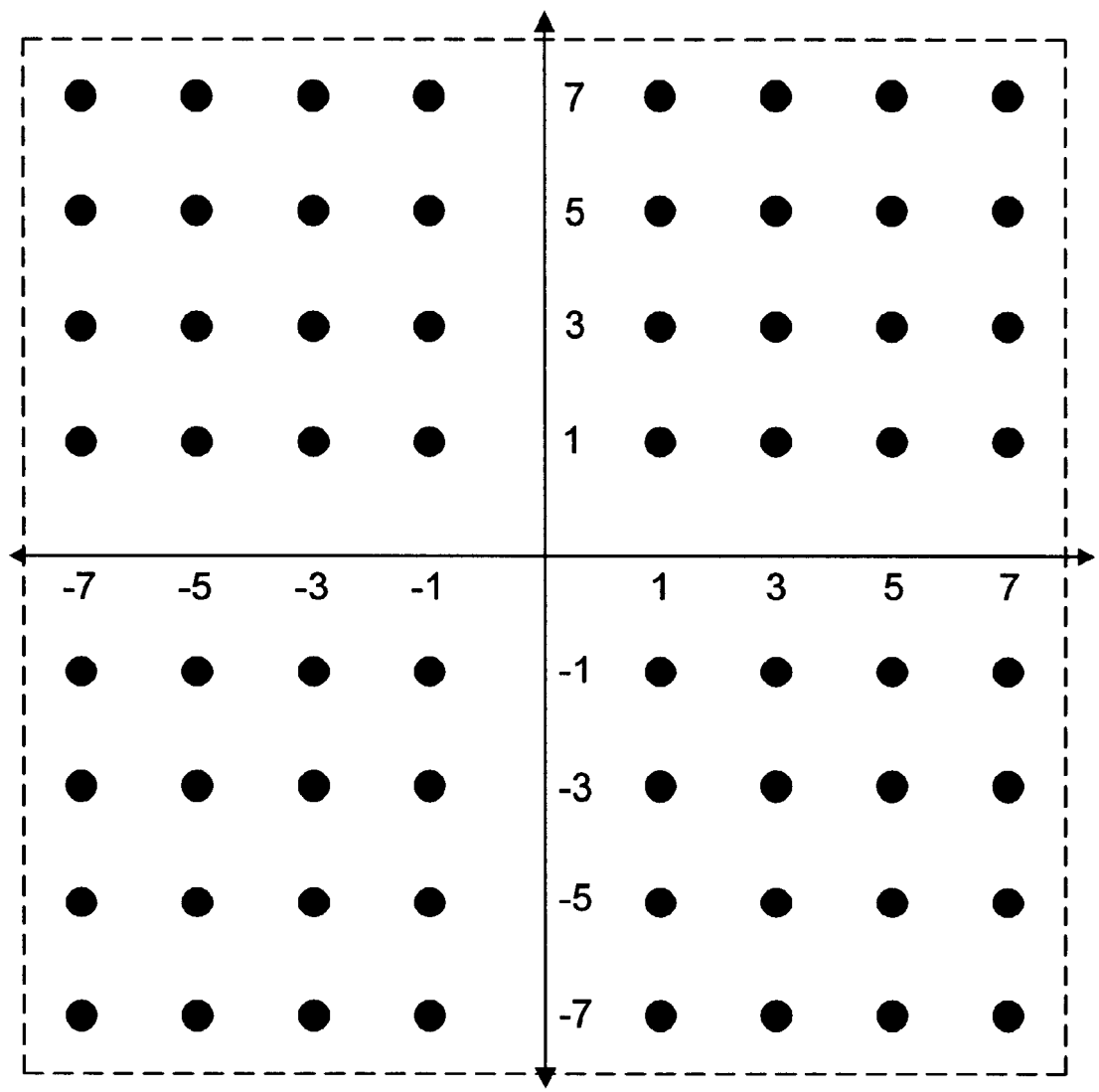
FIG. 4 is an illustrative signal point constellation for use in the preceding system of FIG. 3.

The output signal 102 of adder 95 is applied to modulo 2L element 99. which performs as known in the art, to provide an output data symbol stream 104 For example, modulo 2L element 99 maps the output signal 102 to a position in a signal point constellation. This mapping is performed using modulo 2L arithmetic, where L is the size of a signal point constellation. FIG. 4 shows an illustrative signal point constellation, where L=7+1. The output data symbol stream 104 of FIG. 4 is precoded and ready for transmission to receiver 16 (FIG. 1). The output data symbol stream 104 is also applied to filter 94, which filters signal 104 in accordance with the polynomial function or filter response vector, f(n), using the above-mentioned set of precoder values.

The precoding technique of the prior art utilizes the above-mentioned coefficient values as determined by the receiver 16 (FIG. 1) during training. If the communications channel 12 (FIG. 1) remains constant for the transmission period, no further adaptation is required since the precoding in transmitter 15 (FIG. 1) is equivalently performing the feedback function.

Unfortunately, changes in the communications channel 12 (FIG. 1) induces errors to occur when the precoding is removed by DFE 35 of FIG. 2. Therefore, another ISI filter 64, not utilized in the initialization phase, is utilized in the data phase. The equalizer coefficient values in ISI filter 64 are set to zero during the initialization phase. As the data phase is commenced and changes in the communications channel 12 (FIG. 1) begin to cause distortion, the equalizer coefficient values in ISI filter 64 increase in order to compensate for the distortion. In this regard, ISI filter 64 provides a signal 61 to adder 55 based on signals 72 and 74 and based on the equalizer coefficients within ISI filter 64. When the values of the equalizer coefficients within ISI filter 64 reach a certain level, error propagation begins to occur. When error propagation begins to cause significant error, a retrain occurs wherein the precoder values are replaced by a new set of values through the techniques outlined hereinabove for the initialization phase. Each retrain is disruptive to the communications session in that it interrupts data flow and takes time to both calculate and communicate the necessary equalizer coefficients.

However, in accordance with the inventive concept, the foregoing error propagation problem can be solved by adapting the precoder 85 (FIG. 3) to the changes in the response of the communications channel 12 (FIG. 1).

In accordance with the principles of she present invention, receiver 16 (FIG. 1) is configured to transmit a set of equalizer coefficient values during training to transmitter 15 (FIG. 1) using the techniques described hereinbefore. Transmitter 15 (FIG. 1) is configured to receive the coefficients and to establish a set of precoder values to be used by precoder filter 94 (FIG. 3) as discussed hereinbefore. However, transmitter 15 (FIG. 1) is further configured to adaptively update the precoder values periodically without the occurrence of a retrain. As used herein, the term "adaptively update" shall refer to updating a set of precoder values without the occurrence of a retrain. Furthermore, a "set" of values can refer to one value or a plurality of values.

Figure 5:
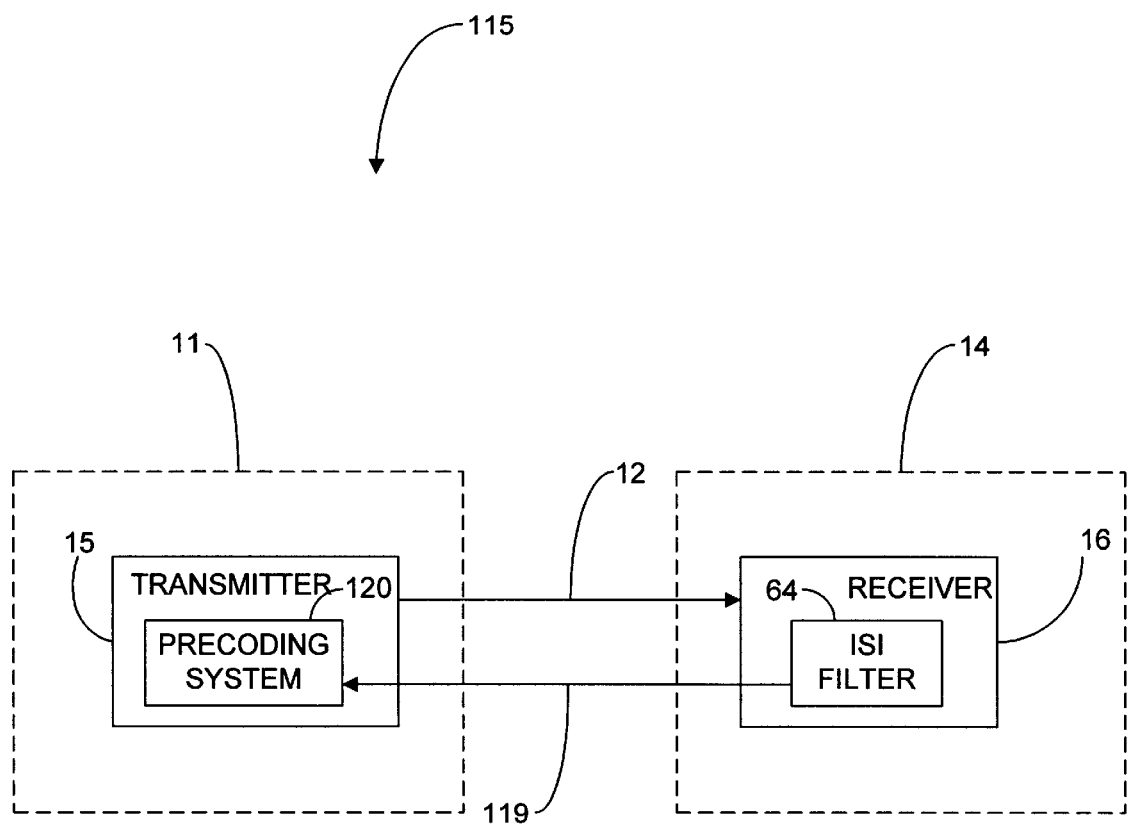
FIG. 5 is a block diagram of a communication system implementing the precoding system of the present invention.

FIG. 5 is an illustrative block diagram of the adaptive communication system 115 of the present invention. After an initial set of precoder values are established in transmitter 15 during training, receiver 16 is configured to periodically transmit equalizer coefficient values within ISI filter 64 to transmitter 15 over secondary channel 119. Secondary channel 119 may be either an in-band channel or an out-of-band channel. A precoding system 120 within transmitter 15 is designed to use the new coefficient values transmitted over secondary channel 119 to update the current precoder values.

Figure 6:
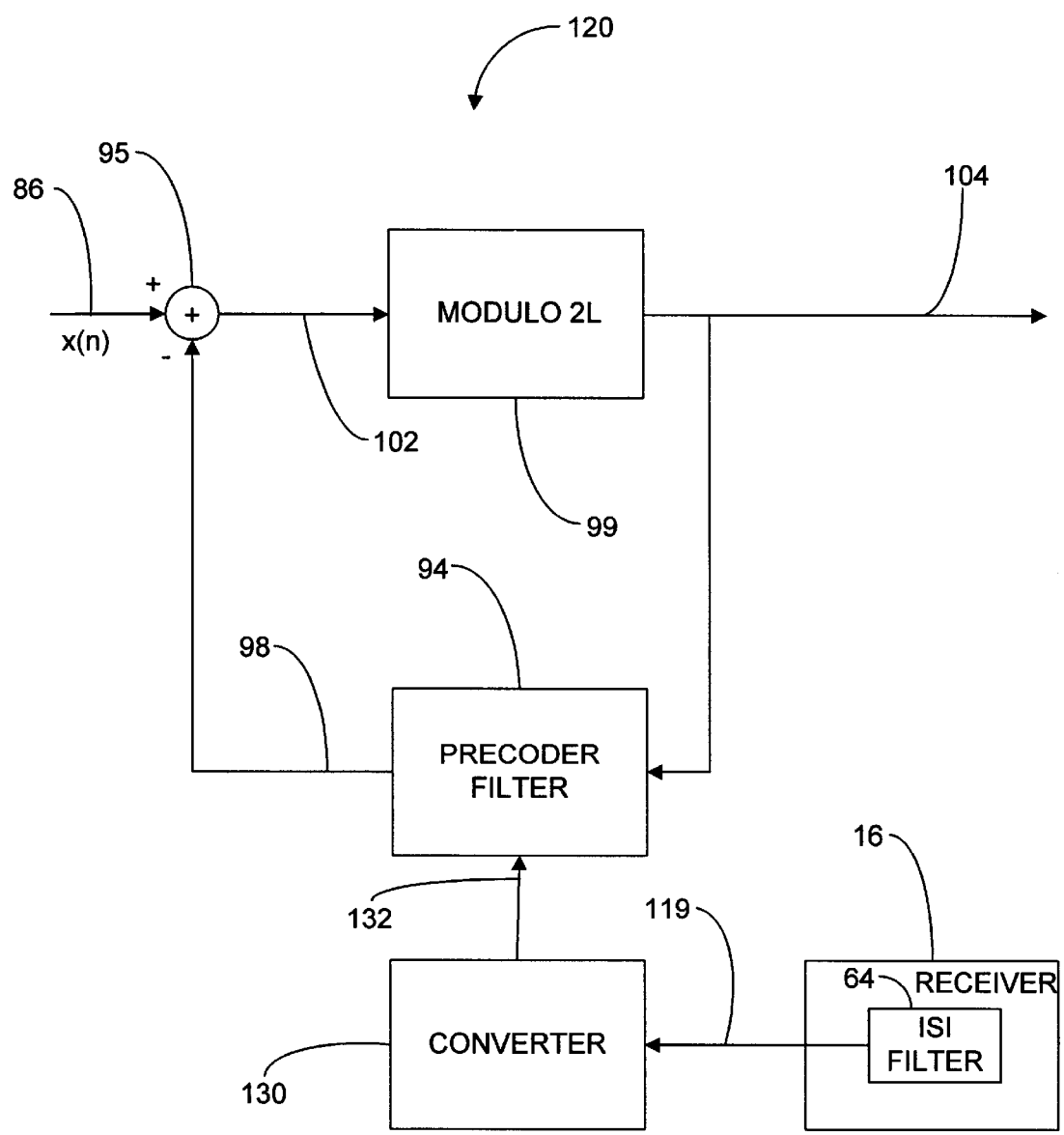
FIG. 6 is a block diagram of a preceding system embodying the principles of the present invention.

In this regard, precoding system 120 includes a converter 130 configured to receive the equalizer coefficient values from ISI filter 64, as depicted by FIG. 6 Converter 130 is configured to determine a new set of precoder values that will compensate for the changes that occurred on communications channel 12 based on the equalizer coefficient values of ISI filter 64 and the current precoder values. Converter 130 is designed to slowly change the current set of precoder values to the new set of precoder values by periodically incrementing each current precoder value a small amount until the new precoder value is reached or a new set of equalizer coefficients is received.

Slowly incrementing the precoder values enables the ISI filter 64 to track the updating of the precoder values. As the precoder values are slowly updated, the quality of the signals received by receiver 16 slowly improves, and, in response, ISI filter 64 is designed to slowly reduce the values of its equalizer coefficient values. As a result, the coefficient values within ISI filter 64 are prevented from reaching values that result in error propagation, thereby preventing the occurrences of retrains.

In order to calculate the new precoder values, converter 130 is designed to contain an algorithm utilizing the following transfer function equation in the frequency domain:

$$H_p^{(n)}(z) = [1 + H_p^{(n-1)}(z)][1 + H_{ISI}^{(n)}(z)] - 1 \qquad (1)$$

where $H_p(z)$ represents the transfer function of a precoder value and $H_{ISI}(z)$ represents the transfer function of a coefficient value from ISI filter 64. Using Equation (2), converter 130 is preferably configured to update each precoder value.

It should be noted that when an NP based filter (not shown) is used to calculate the coefficient values of receiver 16. converter 130 is configured to use the following equation in place of Equation (1):

$$H_p^{(n)}(z) = [1 + H_p^{(n-1)}(z)][1 - H_{NP}^{(n)}(z)] - 1 \qquad (2)$$

where $H_{NP}(z)$ represents the transfer function of an NP equalizer coefficient value. Therefore, whether ISI filters are NP filters are used by receiver 16 does not materially affect the methodology of the present invention.

OPERATION

The preferred use and operation of the adaptive precoding system 120 and associated methodology are described hereafter with reference to FIGS. 5 and 6.

During training, transmitter 15 of FIG. 5 transmits initialization signals to receiver 16, and receiver 16 formulates a set of equalizer coefficient values as described hereinabove. The equalizer coefficients formulated by receiver 16 are preferably communicated to the precoding system 120 of the present invention located in transmitter 15. The coefficients are stored within precoder filter 94 as precoder values, and precoder filter 94 uses the precoder values to precode data signals 86 as disclosed hereinabove. Transmitter 15 then enters the data phase, sometimes referred to as the "communications phase," and communicates the precoded signal 104 to receiver 16. DTE 35 within receiver 16 removes the precoding thereby recovering the original data signal 86. During the communications phase, changes in the channel 12 cause a degradation in communication quality. In response, ISI filter 64 begins to increase its equalizer coefficient values. Periodically, receiver 16 transmits the equalizer coefficient values of ISI filter 64 to transmitter 15 across secondary channel 119. Since the equalizer coefficients are not continuously transmitted, secondary channel 119 may be configured as a low speed channel.

Converter 130 (FIG. 6) determines an updated set of precoder values based on the equalizer coefficient values and the current precoder values. In order to enable the ISI filter 64 to track the changes, converter 130 slowly updates the precoder values. This is preferably done by incrementing each precoder value in a plurality of increments until each precoder value corresponds to the new set of precoder values or until the next set of equalizer coefficients is received.

For example, assume for illustrative purposes only that converter 130 determines that a current precoder value of five (5) needs to be updated to a new precoder value of six (6). Instead of simply replacing the current precoder value with the new precoder value, converter 130 initially increments the current precoder value (5) to a value between five (5) and six (6). By continuously updating the current precoder value in this manner, the value of six (6) is eventually reached. As the communication on channel 12 slowly improves, due to the slow updating of the precoder values, the ISI filter 64 updates its equalizer coefficients accordingly. As a result, the equalizer coefficient values in ISI filter 64 do not reach a point where error propagation occurs. Accordingly, disruptive retrains are prevented.

It should be noted that receiver 16 may transmit the equalizer coefficients one at a time or in sets. Furthermore, it is not necessary for the precoding system 120 to completely update each precoder value before receiving a new set of equalizer coefficients and beginning a new updating phase.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the pending claims.

What is claimed is:

1. A precoding system for generating a precoding signal that can be combined with a data signal in order to precode said data signal prior to a transmission of said data signal across a communications channel, from a transmitter to a receiver, comprising:

a precoder filter having a set of precoder values, said precoder filter configured to generate said preceding signal based on said set of precoder values; and a converter responsive to a set of equalizer coefficients transmitted from a decision feedback equalizer located in said receiver for determining a new set of precoder values based on said set of equalizer coefficients and said set of precoder values and for updating said set of precoder values based on said new set of precoder values without disrupting the flow of data between said transmitter and said receiver, wherein said converter updates at least one of said set of precoder values in a plurality of increments in response to said new set of precoder values.

2. The system of claim 1, wherein said set of equalizer coefficients are generated during a communications phase that occurs subsequent to an initialization phase.

3. The system of claim 1, wherein said set of equalizer coefficients are transmitted across a secondary channel.

4. The system of claim 1, wherein said converter increments said one precoder value until said one precoder value matches a value of said new set of precoder values.

5. The system of claim 2, wherein said set of precoder values are initialized during said initialization phase.

6. The system of claim 2, further comprising a receiver responsive to said data signal for removing said preceding signal from said data signal, said receiver having said decision feedback equalizer for determining said set of equalizer coefficients during said communications phase, wherein said set of equalizer coefficients are updated in response to changes in said set of precoder values.

7. The system of claim 3, wherein said secondary channel is a low speed communications channel.

8. A method for preceding a data signal, comprising the steps of:

receiving a first set of coefficient values during an initialization phase;

initializing a set of precoder values based on said first set of coefficient values;

generating a precoding signal based on said set of precoder values;

combining said preceding signal to said data signal in order to precode said data signal.

transmitting said data signal across a communications channel from a transmitter to a receiver, subsequent to said combining step;

receiving a second set of coefficient values from said receiver during a communications phase that occurs subsequent to said initialization phase;

determining a new set of precoder values based on said second set of coefficient values and said set of precoder values;

updating said set of precoder values based on said new set of precoder values, wherein said updating step includes the step of changing at least one of said set of precoder values in a plurality of increment; and preventing disruption of data flow between said transmitter and said receiver during said updating step.

9. The method of claim 8, further comprising the step of updating said second set of coefficient values based on changes that occur in response to said nondisruptively updating step.

10. The method of claim 8, wherein said second set of coefficient values are generated in response to changes detected in said communications channel.

11. The method of claim 8, wherein said first set of coefficient values match said set of precoder values initialized in said initializing step.

12. The method of claim 9, further comprising the step of transmitting said second set of coefficient values across a secondary channel.

13. A system for preceding a data signal, comprising:

means for receiving a first set of coefficient values during an initialization phase;

means for initializing a set of precoder values based on said first set of coefficient values;

means for generating a precoding signal based on said set of precoder values;

means for combining said precoding signal to said data signal in order to precode said data signal;

means for transmitting said data signal across a communications channel from a transmitter to a receiver;

means for receiving a second set of equalizer coefficients from said receiver during a communications phase that occurs subsequent to said initialization phase;

means for determining a new set of precoder values based on said second set of coefficients and said set of precoder values; and means for nondisruptively updating said set of precoder values based on said new set of precoder values without disrupting the flow of data between said transmitter and said receiver, wherein said updating means includes a means for changing at least one of said set of precoder values in a plurality of increments.

14. The system of claim 13, further comprising a means for updating said second set of coefficient values based on changes that occur in response to said updating means.

15. The system of claim 13, wherein said second set of coefficients are generated in response to changes detected in said communications channel.

16. The system of claim 13, wherein said first set of coefficient values match said set of precoder values initialized by said initializing means.

17. The system of claim 13, further comprising a means for transmitting said second set of coefficient values across a secondary channel.

* * * * *

UNITED STATES PATENT AND TRADEMARK OFFICE
CERTIFICATE OF CORRECTION

PATENT NO.    : 6,243,425 B1
DATED         : June 5, 2001
INVENTOR(S)   : Langberg et al.

Page 1 of 1

It is certified that error appears in the above-identified patent and that said Letters Patent is hereby corrected as shown below:

<u>Column 7, claim 8,</u>
Line 15, please delete "preceding" and substitute therefor -- precoding --.
Line 38, please delete "increment" and substitute therefor -- increments --.

<u>Column 8, claim 13,</u>
Line 7, please delete "preceding" and substitute therefor -- precoding --.

Signed and Sealed this

Fifteenth Day of January, 2002

Attest:

JAMES E. ROGAN
Attesting Officer    Director of the United States Patent and Trademark Office